July 24, 1928.
M. SCHONBRUN
1,678,537
PARACHUTE
Filed July 20, 1927
2 Sheets-Sheet 1
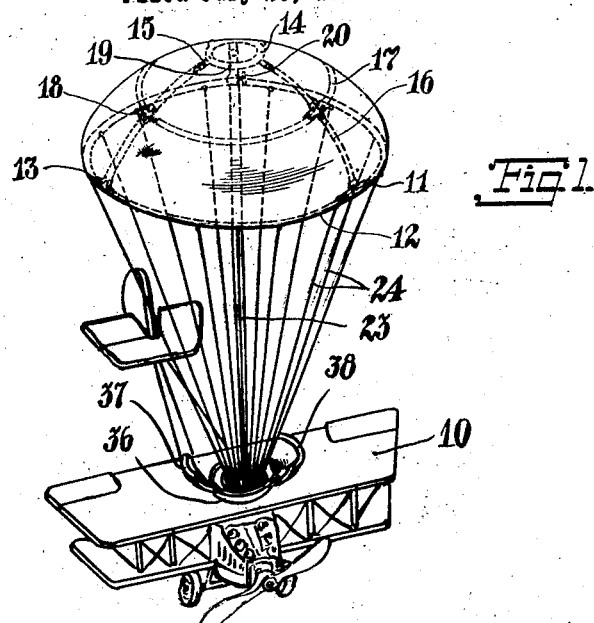
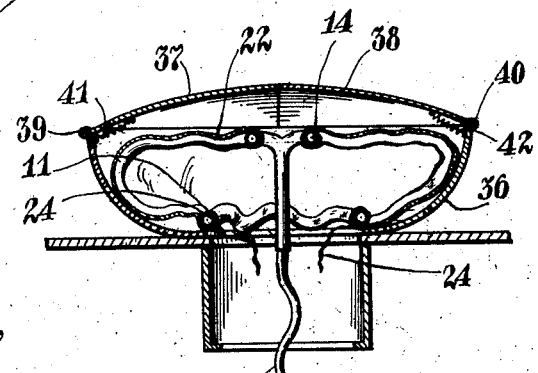
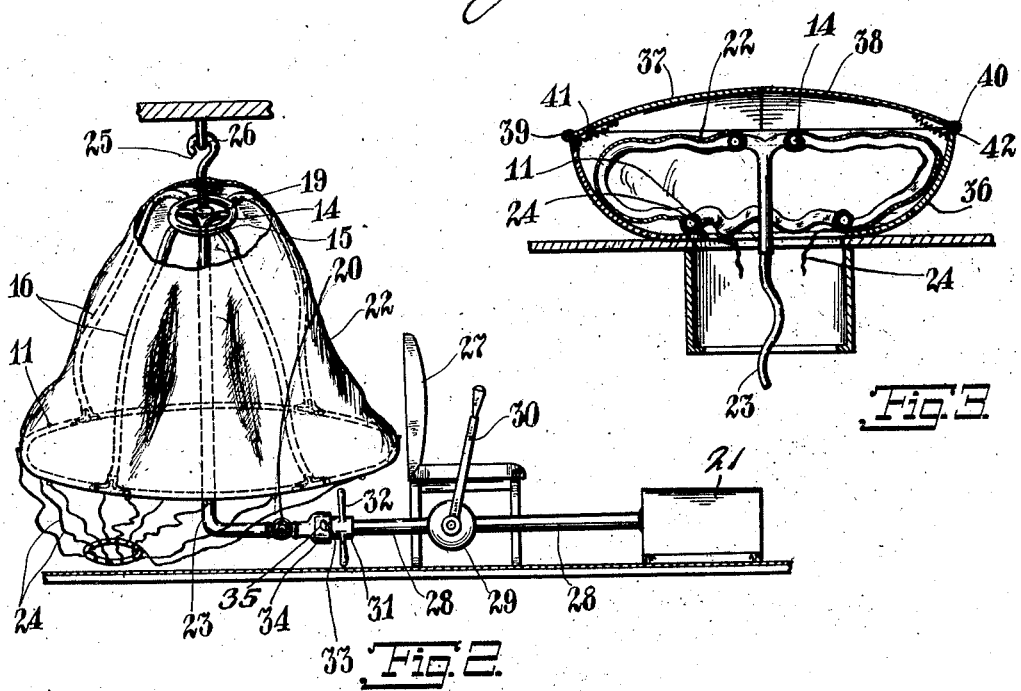
INVENTOR
Max Shonbrun
BY
ATTORNEY July 24, 1928.
M. SCHONBRUN
PARACHUTE
Filed July 20, 1927      2 Sheets-Sheet 2
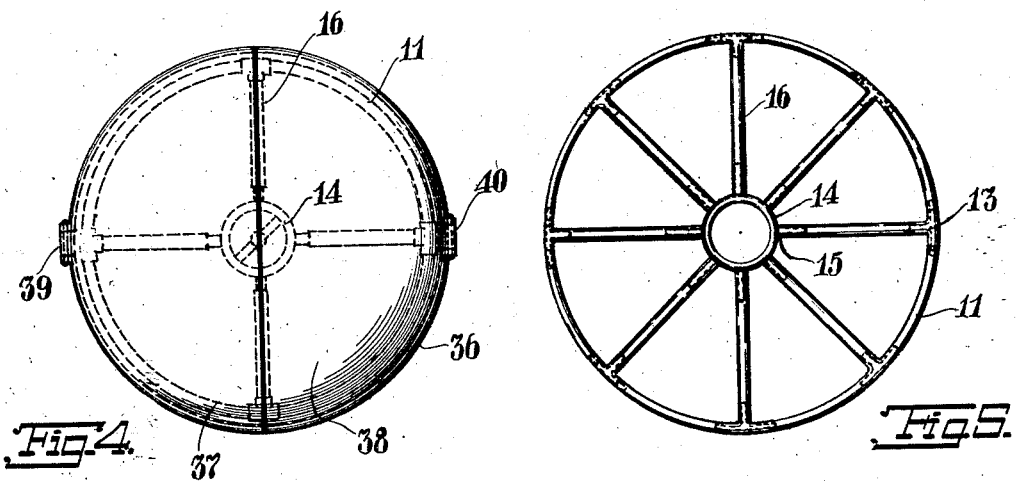
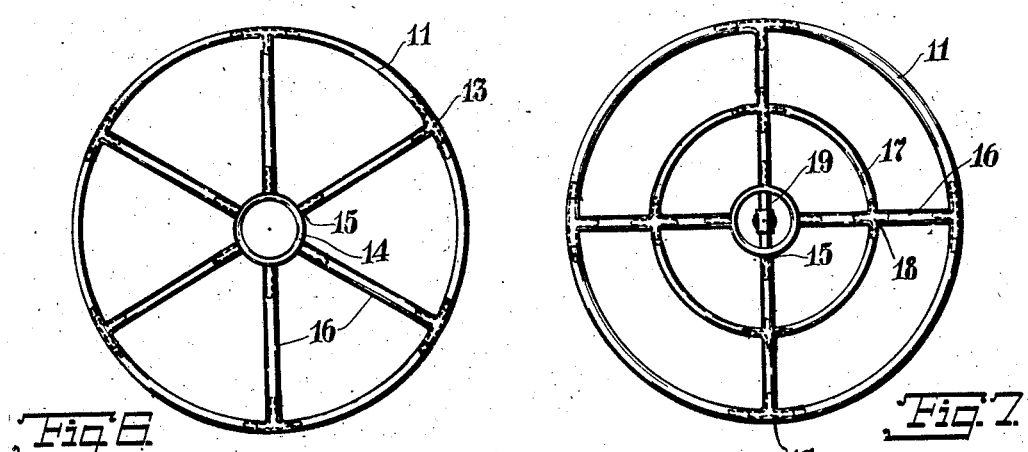
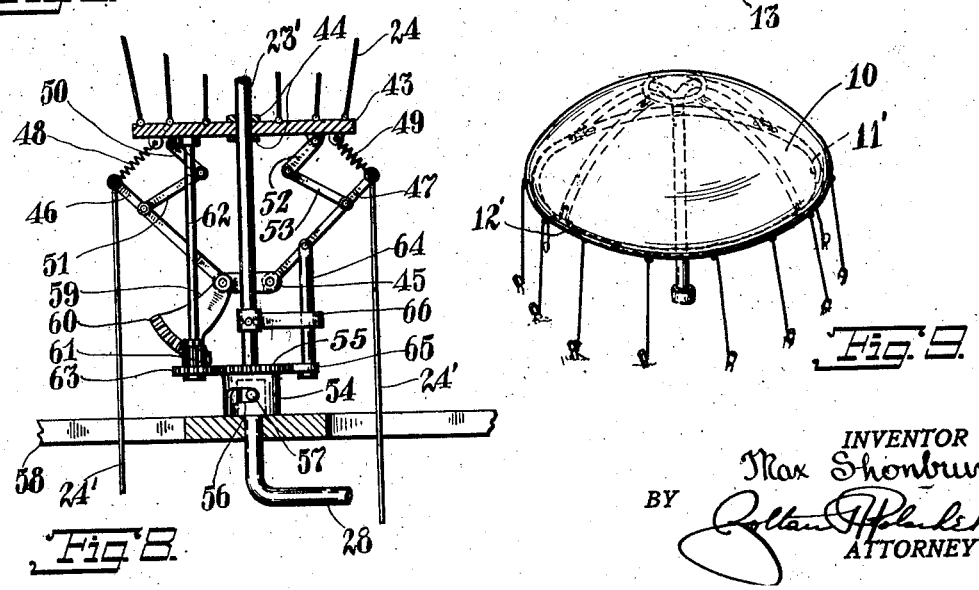
INVENTOR
Max Shonbrun
BY
Zoltan Holenksky
ATTORNEY Patented July 24, 1928.

1,678,537

UNITED STATES PATENT OFFICE.

MAX SCHONBRUN, OF NEW YORK, N. Y.

PARACHUTE.

Application filed July 20, 1927. Serial No. 207,054.

This invention relates to certain new and useful improvements in parachutes and has for one of its objects the provision of a parachute which is adapted to be expanded to open position by compressed air.

Another object of my invention is the provision of a casing for carrying a parachute on an aeroplane. A still further object of my invention is the provision of a means for suspending two men from the same parachute in spaced relation.

A further object of my invention is the provision of means for automatically disconnecting the air expanding system of the parachute from an aeroplane when a man is suspended from the parachute.

Other objects will appear hereinafter the novel features and combinations being more clearly set forth in the appended claims.

In the drawing:

Fig. 1 is a perspective view of a parachute embodying my invention shown attached to the wing of an aeroplane.

Fig. 2 is a perspective view of the parachute disposed in folded or unexpanded position and including a diagrammatic illustration of the inflating mechanism associated with my invention.

Fig. 3 is a sectional view of a further development thereof.

Fig. 4 is a top plan view of the device shown in Fig. 3.

Fig. 5 is a top plan view of the tubular frame of the device.

Fig. 6 is a top plan view of a modified tubular frame embodied in the device.

Fig. 7 is a top plan view of a further development of the tubular frame of the device.

Fig. 8 is a sectional view of a further modification of the device.

Fig. 9 is a perspective view of a tent adapted to be expanded to erect position by compressed air.

Referring particularly to Fig. 1, the numeral 10 designates an aeroplane wing and the numeral 11 a ring comprising flexible tubular segments 12 preferably of rubber. These segments are communicatively joined together at their extremities by T-joints 13 which are preferably made of aluminum. A tubular aluminum ring member 14 is disposed at the top of the parachute and is provided with tubular radially extended arms 15 which are connected by radially disposed flexible tubular members 16 with the T-joints 13 of the lower ring 11. If it is desired, an intermediate ring 17 may be provided in the body of the parachute. When the intermediate ring is employed the tubular members 16 may be divided into sections and a cross joint 18 disposed therebetween as shown in Figs. 1 and 7. A tubular extension 19 is communicatively connected with the aluminum ring 14 and is provided with a one way valve 20 adapted to prevent the escape of air from the tubular frame construction. A conduit 23 is attached to the extension 19 at one end, and is disposed through an aperture in the wing 10 and connected as shown in Fig. 2, with a compressed air tank 21. It should be understood that the parachute is normally closed and when in closed condition resembles a closed umbrella and that when compressed air is admitted into the tubular frame structure the parachute will open. The frame structure is provided with a covering 22 and ropes 24 are attached to the lower ring 11 and to the wing 10. When the parachute is in open position it will aid in supporting the aeroplane and in effecting a successful landing in an emergency.

In Fig. 2 a parachute is shown which is particularly adapted to support a person. The ring member 14 is attached by a detachable hook 25 to a ring 26 conveniently mounted on the structure of an aeroplane and the cords 24 attached to the lower ring are coiled and extended to a position adjacent the seat 27 of the aeroplane. The air tank 21 is provided with a pipe 28 having a valve 29 disposed between the ends thereof which is operable by a lever 30 positioned adjacent the seat 27. A sleeve 31 is rotatively mounted on the end of the pipe 28 and is provided with handles 32 and a pin 33. This sleeve is adapted to coact with a coupling member 34 on the end of the conduit 23 in detachably securing the ends of the pipe 28 and conduit 23 together. The coupling member 34 is provided with an irregular slot 35 into which the pin 33 may be disposed forming a bayonet joint between the sleeve 31 and the coupling 34.

It should be understood that the lever 30 is first actuated to cause the air to flow into the tubular frame of the parachute which causes the expansion of the parachute. After the device has been suitably expanded the handles 32 may be actuated for separating the conduit 23 from the pipe 28, and a person may either by gripping the cords 24 or fastening the same around himself, be suspended from the parachute.

As shown in Figs. 3 and 4, a parachute of the type described may be stored in a circular container 36 of saucer shape which is preferably secured to the upper surface of a wing of an aeroplane directly above the cockpit thereof. The entire parachute including the tubular frame structure, ropes 24, covering 22 and conduit 23, may be disposed in the container 36 in folded or coiled position. The container 36 is provided with a cover comprising substantially semicircular sections 37 and 38, which are pivotally attached to the sides of the container 36 by hinges 39 and 40, respectively. Springs 41 and 42 are connected to the covers 37 and 38, respectively, and to the container 36 for normally holding the covers in closed position. It should be understood that the conduit 23 is communicatively connected with a source of compressed air and that when compressed air is supplied to the tubular frame structure the same will be expanded causing the doors 37 and 38 to be opened for permitting the parachute to rise out of the container 36 and to play in the air above the plane to which it is attached for supporting the same when the plane falls.

In the modified form of my invention shown in Fig. 8, the ropes 24 are attached at their lower extremities to a disc 43 having an aperture therein through which a pipe 23' is disposed. The pipe 23' is rigidly mounted on the disc 43 by brackets 44 and is communicatively connected with the conduit 23. A block 45 is rigidly attached to the pipe 44 to which are pivotally attached spacing arms 46 and 47. The spacing arms 46 and 47 are held in their uppermost position by springs 48 and 49, respectively, which are attached at one end to said arms and at the other end to the disc 43. Ropes 24' are attached to the upper ends of the spacing arms. The ropes may be tied to a person or gripped by a person when the parachute is employed and when the ropes are employed, the arms 46 and 47 will be rotated outwardly for supporting two persons in spaced relation to each other.

A lever 50 is pivotally attached to the disc 43 at one end and pivotally attached to a second lever 51 at the other end which in turn is pivotally attached to the arm 46. Similar levers 52 and 53 are connected with the disc 43 and with the other arm 47. These levers serve to restrain outward rotation of the arms 47 for suitably retaining the same in a predetermined position.

It is advantageous to automatically separate the pipe 23' from the pipe 28 after inflation of the tubular frame structure of the parachute and in this form of the device mechanism is provided for separating the two pipes automatically when both of the arms 46 and 47 are rotated downwardly. A coupling member 54 is rotatively mounted on the lower end of the pipe 23' and is provided with a gear 55 rigidly attached thereto. The coupling is provided with an irregular slot 56 which is adapted to receive a pin 57 mounted on the end portion of the pipe 28 which is disposed through an aperture in a support 58 of the aeroplane. An extension 59 having rack teeth 60 thereon is integral with the arm 46. The teeth of the extension 59 are meshed with teeth of a pinion 61 which is rotatively mounted on a rod 62 attached at its upper extremity to the disc 43. A gear 63 is also journaled on the rod 62 and is rigidly attached to and positioned concentric with the pinion 61. The gear 63 is meshed with the gear 55 of the coupling 54 and is adapted to rotate the same when the arm 46 is rotated downwardly for bringing the entrance of the irregular slot 56 into registration with the pin 57. It should be understood that it is desired not to disconnect the pipe 23' from the pipe 28 until both arms 46 and 47 have been rotated. Locking mechanism operable by the arm 47 is provided to prevent rotation of the coupling member 54 until after the arm 47 has been lowered. This locking mechanism comprises a rod 64 pivotally attached at its upper end to the arm 47 and provided with a gear segment 65 meshed with the gear 55 of the coupling 54. The rod 64 is slidably guided in a slot of a bracket 66 which is mounted on the pipe 23' and when the arm 47 is rotated downwardly the gear segment 65 is moved out of engagement with the gear 55 rendering the latter free to be rotated by downward movement of the arm 46.

As shown in Fig. 9, a tent comprising a canvas member 10' may be provided with longitudinally and laterally disposed tubular members 11' and 12' which may be connected with a source of compressed air supply. When the tubular members are filled with air the tent will be expanded to erect position.

Having thus fully described and shown an embodiment of my invention, what is desired to be secured by Letters Patent of the United States is:

1. A parachute of the class described comprising an aluminum tubular ring member, radially extending tubular arms communicatively connected with said ring member, radially extending tubes communicatively connected with said arms, a lower ring comprising flexible sections of tubular material communicatively connected with said radially extending tubes, a conduit connected with said aluminum ring adapted to supply compressed air thereto and to said lower ring and radially extending arms for expanding said parachute from closed to open position, and ropes attached at one end to said lower ring and at the other end to a wing of an aeroplane.

2. A device of the class described comprising a saucer shaped container mounted on the wing of an aeroplane, a parachute disposed in said container comprising a tubular frame, a conduit connected with said tubular frame for supplying compressed air thereto, cover sections pivotally attached to the sides of said container adapted to close the upper end thereof, and springs attached at one end to one of said cover sections and at the other end to the side of said container adapted to resiliently retain said cover in closed position, said parachute being adapted to open said cover sections against the action of said springs when said tubular frame is expanded by the admission of compressed air thereto.

3. In a parachute of the class described, a body portion comprising a tubular frame, a conduit communicatively connected with said tubular frame, a plurality of ropes attached to said tubular frame, a disc attached to said ropes, adapted to be suspended thereby, said disc being provided with an aperture, a pipe disposed through said aperture and communicatively connected with said conduit, a coupling member rotatively mounted on the other end of said pipe, a pipe mounted on an aeroplane support and connected with said first mentioned pipe by said coupling member and spacing arms pivotally mounted on said pipe and operatively connected with said coupling member adapted to support two persons in spaced depending relation and to effect disconnection of said pipes when said arms are rotated downwardly.

4. A parachute of the class described comprising a body portion adapted to be expanded by compressed air, a conduit attached to said body portion for supplying compressed air thereto, depending ropes attached to said body portion, a disc adapted to be supported by said depending ropes, a pipe mounted in said disc and communicatively connected with said conduit, a coupling member relatively mounted on said pipe adapted to connect the same to a source of supply of compressed air, a block mounted on said pipe, spacing arms pivotally mounted on said block, ropes attached to said spacing arms for attaching a person thereto, said arms being adapted to be rotated for spacing persons attached to said ropes, an extension comprising rack teeth integral with one of said spacing arms, driving mechanism mounted on said disc and operatively connected with said rack teeth and said rotatively mounted coupling member adapted to rotate the same for disconnecting said pipe from said source of compressed air when said arm is rotated, and locking mechanism comprising a rod pivotally attached to the other spacing arm and engaged with said coupling adapted to be moved out of engagement therewith for rendering said coupling free to be rotated when said arms are rotated.

In testimony whereof I have affixed my signature.

MAX SCHONBRUN.